: 2,999,842
Patented Sept. 12, 1961

2,999,842
STABILIZED CURED ELASTOMERS

Ernest Csendes, Wilmington, Del., assignor to E. I. du Pont de Nemours and Company, Wilmington, Del., a corporation of Delaware
No Drawing. Filed Dec. 24, 1958, Ser. No. 782,627
6 Claims. (Cl. 260—45.95)

This invention is directed to an improved elastomer composition protected from degradation caused by heat aging, said composition containing the hereinafter described synergistic antioxidants.

It has long been known that heat aging is deleterious to the physical properties of cured elastomer stock. In particular, there is a sharp loss in tensile strength. Although antioxidants have customarily been incorporated, they have not provided sufficient protection.

It is, therefore, an object of the present invention to provide an improved elastomer composition wherein cured elastomer stock is protected from the deterioration of its physical properties which occurs during heat aging. It is another object to promote the activity of antioxidants which are useful in protecting cured elastomers from degradation during heat aging. It is a further object to provide a non-discoloring synergistic antioxidant combination to protect cured elastomer stock. It is still a further object to facilitate the use of non-discoloring phenolic antioxidants in elastomer stock.

These and other objects will become apparent in the following description and claims.

More specifically, the present invention is directed to a cured elastomer having incorporated therein a stabilizing amount of a synergistic combination of a phenolic antioxidant and thio-substituted aliphatic polyol. The use of a filler is optional.

More particularly, the invention concerns an elastomer composition having improved stability toward heat aging, which compound comprises: 100 parts by weight of a cured elastomer; 0.1 to 5 parts by weight of a phenolic antioxidant; 0.1 to 5 parts by weight of a thio-substituted aliphatic polyol, there being present, as a matter of preference, for every part by weight of said phenolic antioxidant, at least 0.25 part by weight of said thio-substituted aliphatic polyol.

In order to prepare the present novel composition, it is necessary to compound uncured elastomer stock in the usual manner with a stearic acid, sulfur, conventional vulcanization accelerators, and the components of the described synergistic combination. The compounded stock is then cured by heating in the conventional manner of the trade.

The elastomer employed in the subject invention may be either natural rubber or synthetic rubber made from conjugated dienes. Representative examples of the latter are: polyisoprene having an essentially all-cis configuration, butadiene-styrene copolymer (known as SBR rubber), polychloroprene, butadiene-2,3-dimethyl butadiene copolymer, poly 2,3-dimethyl butadiene (known as methyl rubber), poly 2-chloro-3-methyl-butadiene-1,3, butadiene-dichlorostyrene copolymer, butadiene-monochlorostyrene copolymer, butadiene-alpha-methylstyrene copolymer, butadiene-p-methoxystyrene copolymer, butadiene-dimethylstyrene copolymer, butadiene-dimethoxystyrene copolymer, butadiene-alpha-methyl-p-methylstyrene copolymer, butadiene-p-phenyl styrene copolymer, isoprene-styrene copolymer, isoprene-butadiene copolymer, 2-isopropyl butadiene-styrene copolymer, 2-ethyl butadiene-styrene copolymer, 2-n-amyl-butadiene-styrene copolymer, polybutadiene, poly 2-ethyl butadiene, poly 2-isopropyl butadiene, poly 2-n-amyl butadiene, polycis-piperylene, butadiene-1-cyanobutadiene copolymer, isoprene-chloroprene copolymer, poly 2-fluorobutadiene, and butadiene-2-methyl-4-methoxy-5-isopropyl styrene copolymer. Butadiene-acrylonitrile copolymer (known as Perbunan), butadiene-methylisopropenyl ketone copolymer, and chloroprene-methylisopropenyl ketone copolymer are representative examples of other elastomers which may be used.

The synergistic combination of this invention consists of two components: phenolic antioxidants, and, certain thio-substituted aliphatic polyhydroxy compounds. The antioxidants alone provide cured elastomer stock with only a limited measure of protection against heat aging. It was, therefore, entirely unexpected that a combination of these two reagents would provide an exceptionally enhanced measure of protection against, for example, heat aging and resulting discoloration.

The reasons for this synergistic activity are not understood. It is not possible to predict what thio-substituted aliphatic polyhydroxy compounds will be operable.

Fillers such as calcium carbonate, titanium dioxide, clay, and barium sulfate may be used with the phenolic antioxidants and the described thio-substituted aliphatic polyhydroxy compounds; other fillers such as silica, carbon black, and magnesium carbonate are inoperable, and, barium carbonate can only be used at low concentrations.

It is believed that any phenolic antioxidant may be used in this invention. By phenolic antioxidant is meant a phenolic compound, which, when added to an elastomer in small proportions, retards atmospheric oxidation or the effect of oxidation. It is to be understood that the activity of some antioxidants may be promoted more effectively than that of other antioxidants by the combined presence of the selected thio-substituted aliphatic polyols.

Representative examples of antioxidants which may be employed are: 2,2'-methylenebis(6-tert-butyl-4-methyl phenol), 2,2'-methylenebis(6-tert-butyl-4-ethyl phenol), 2,2' - methylenebis[4 - methyl - 6 - (1,1,3,3 - tetramethyl)butyl phenol], 4,4'-bis(2-tert-butyl-5-methyl phenol) sulfide, 4,4'-butylidine-bis(2-tert-butyl-5-methyl phenol), 2,2'-methylenebis(4,6-dimethyl phenol), 2-tert-butyl-4(4-tert-butyl phenyl)phenol, 2-tert-butyl-4-phenyl phenol, 2,6-dibenzyl-4-methyl phenol, 2-benzyl-4-methyl phenol, 2-benzyl-6-tert-butyl-4-methyl phenol, 2-benzyl-6-tert-butyl-4-ethyl phenol, 2,4-dimethyl-6-(1-methyl-1-cyclohexyl) phenol, 2,6-diisopropyl-4-methyl phenol, 2,4-dimethyl-6-isopropyl phenol, 2-tert-butyl-4,6-dimethyl phenol, 2-tert-butyl-4-methyl phenol, 2-(1,1,3,3-tetramethyl butyl)-4-methyl phenol, 2,4,6-trimethyl phenol, 2,6-di-tert-butyl-4-methyl phenol, 2,6-di-tert-butyl-4-ethyl phenol, 4-phenyl phenol, 2,6-diisopropyl phenol, 2,6-di-tert-butyl-4-phenyl phenol, 2,6-di-tert-butyl-4(4-tert-butyl-phenyl)phenol, 2,5-di-tert-butyl-hydroquinone, 2,5-di-tert-amyl-hydroquinone, and alpho-conidendrine. Mixtures of the foregoing may be used.

There appears to be no criticality in the ratio of the thio-substituted aliphatic polyhydroxy compound to the antioxidant; however, better results are obtained when at least about 0.25 part of said polyol is present for each part by weight of the antioxidant; it is preferred to use about equal weights of both. In practice, their individual concentrations may range from about 0.1 to 5% by weight of the elastomer. Less satisfactory protection is gained when lower concentrations are used; higher concentrations are less economically attractive. The preferred concentration range is about 0.5–1.5% by weight of the elastomer.

If a filler is used, there is no criticality in the value of the weight ratio of the filler to either of the members of the synergistic combination. The best results for calcium carbonate, titanium dioxide, clay, and barium sulfate are obtained when about 50 to 100 parts are used for every 100 parts by weight of the elastomer; levels as low as 5 parts of filler by weight may be utilized.

The compounded elastomer stock may be sulfur cured by techniques well known in the art. In general, about two parts of sulfur per 100 parts of elastomer is necessary to effect the cure in the presence of appropriate accelerators. The uncured elastomer stock may be easily compounded with the described synergistic combination without increased scorchiness. Vulcanization is accomplished by heating the compounded stock (usually in a mold) at a temperature of about 100 to 180° C. for a period ranging from about a half hour to several hours. It is to be understood that various modifications of this sulfur curing may be employed depending upon the stock. Various procedures and modifications of sulfur curing are more particularly described in Encyclopedia of Chemical Technology, Kirk and Orthmer, published by Inter-Science Ecyclopedia Inc., New York, 1953, Volume 11, pages 892–927; Principles of High-Polymer Theory and Practice, Schmidt and Marlies, published by McGraw-Hill Book Co., New York, 1948, pages 556–566; and Industry and Technology of Rubber, Davis and Blake, published by Reinhold Publishing Corp., New York, 1937, Volume 74, Chapter 6.

Representative examples illustrating the present invention are as follows.

EXAMPLES

*Example 1*

A. Masterbatches 1–A, 1–B and 1–C are prepared having the following composition: 100 parts of pale crepe rubber, 5 parts of zinc oxide, 13 parts of titanium dioxide, 67 parts of calcium carbonate (whiting), 1 part of stearic acid, 1 part of 2,2'-dithiobisbenzothiazole, 0.1 part of 2-mercaptobenzothiazole, and 2 parts of sulfur. To Masterbatches 1–A, 1–B and 1–C are added, respectively, 1 part of 1-thiosorbitol, 1 part of 2,2'-methylenebis(6-tert-butyl-4-methyl phenol), and 1 part each of 1-thiosorbitol and 2,2' - methylenebis(6 - tert - butyl - 4 - methyl phenol). They are then cured at 142° C. for 30 minutes. Vulcanizates 1–A, 1–B, and 1–C thereby obtained are heat aged at 121° C in air for 24 hours. The combination of 1-thiosorbitol with 2,2'-methylenebis(6-tert-butyl-4-methyl phenol) provides much better protection than either component alone. The data obtained are shown in Table 1 below.

TABLE 1

| Vulcanizate | Initial $T_B$ | Percent retention of $T_B$ |
| --- | --- | --- |
| 1–A | 2,900 | 16 |
| 1–B | 3,100 | 40 |
| 1–C | 3,090 | 63 |

B. When 1-thioxylitol is substituted for 1-thiosorbitol in the preparation of Vulcanizate 1–C, 71% of the initial tensile strength is retained after heat aging at 121° C. for 24 hours.

C. When 4,4'-bis(2-tert-butyl-5-methyl phenol) sulfide is substituted for 2,2'-methylenebis(6-tert-butyl-4-methyl phenol) in the preparation of Vulcanizates 1–B and 1–C, 37 and 69%, respectively, of the initial tensile strengths are retained after heat aging at 121° C. for 24 hours.

D. When 2-tert-butyl-4-phenyl phenol is substituted for 2,2'-methylenebis(6-tert-butyl-4-methyl phenol) in the preparation of Vulcanizates 1–B and 1–C above, 26 and 53%, respectively, of the initial tensile strengths are retained after heat aging at 121° C. for 24 hours.

*Example 2*

A. Masterbatches 2–A and 2–B are prepared having the following composition: 100 parts of pale crepe rubber, 5 parts of zinc oxide, 1 part of stearic acid, 1 part of 2,2'-dithiobisbenzothiazole, 0.1 part of 2-mercaptobenzothiazole, 2 parts of sulfur and 1 part of 2,2'-methylenebis(6-tert-butyl-4-methyl phenol). To Masterbatch 2–B is also added 1 part of thiosorbitol. The masterbatches are then cured at 142° C. for 30 minutes.

Vulcanizates 2–A and 2–B thereby obtained are heat aged at 121° C. in air for 24 hours. The data obtained are shown in Table 2 below.

TABLE 2

| Vulcanizate | Initial $T_B$ | Percent retention of $T_B$ |
| --- | --- | --- |
| 2–A | 3,825 | 13 |
| 2–B | 3,800 | 39 |

B. When any of the following compounds is substituted for 1-thiosorbitol in the procedure of Part A above, similar results are obtained:

(1) 1-thiomannitol
(2) 1-thiogalactitol
(3) 1-thiotalitol
(4) 1-thioiditol
(5) 1-thioallitol
(6) 1-thioaltritol
(7) 1-thiogulitol
(8) 1-thioarabitol
(9) 1-thioribitol
(10) 1-thioxylitol
(11) 1-thiolyxitol C. When any of the following compounds is substituted for 2,2'-methylenebis(6-tert-butyl-4-methyl phenol) in the procedures of Parts A and B above, essentially the same results are obtained:

(1) 2,2'-methylenebis(6-tert-butyl-4-ethyl phenol)
(2) 2,2'-methylenebis[4-methyl - 6(1,1,3,3-tetramethyl)-butyl phenol]
(3) 4,4'-bis(2-tert-butyl-5-methyl phenol) sulfide
(4) 4,4'-butylidine-bis(2-tert-butyl-5-methyl phenol)
(5) 2,2'-methylenebis(4,6-dimethyl phenol)
(6) 2-tert-butyl-4(4-tert-butyl-phenyl)phenol
(7) 2-tert-butyl-4-phenyl phenol
(8) 2,6-dibenzyl-4-methyl phenol
(9) 2-benzyl-4-methyl phenol
(10) 2-benzyl-6-tert-butyl-4-methyl phenol
(11) 2-benzyl-6-tert-butyl-4-ethyl phenol
(12) 2,4-dimethyl-6-(1-methyl-1-cyclohexyl)phenol
(13) 2,6-diisopropyl-4-methyl phenol
(14) 2,4-dimethyl-6-isopropyl phenol
(15) 2-tert-butyl-4,6-dimethyl phenol
(16) 2-tert-butyl-4-methyl phenol
(17) 2-(1,1,3,3,-tetramethyl-butyl)-4-methyl phenol
(18) 2,4,6-trimethyl phenol
(19) 2,6-di-tert-butyl-4-methyl phenol
(20) 2,6-di-tert-butyl-4-ethyl phenol
(21) 4-phenyl phenol
(22) 2,6-diisopropyl phenol
(23) 2,6-di-tert-butyl-4-phenyl phenol
(24) 2,6-di-tert-butyl-4(4-tert-butyl-phenyl)phenol
(25) 2,5-di-tert-butyl-hydroquinone
(26) 2,5-di-tert-amyl-hydroquinone

*Example 3*

A. Masterbatches 3–A to 3–F are prepared having the following composition: 100 parts of pale rubber crepe, 5 parts of zinc oxide, 1 part of stearic acid, 1 part of 2,2'-dithiobisbenzothiazole, 0.1 part of 2-mercaptobenzothiazole, and 2 parts of sulfur. They are further compounded, as shown in Table 3 below, to give Stocks 3–A to 3–F which are then cured at 142° C. for 30 minutes. The vulcanizates obtained are heat aged in air at 121° C. for 24 hours. The data obtained are given in Table 3 below.

Table 3

| Stock | Filler | | Additive | | Percent retention of T_B |
|---|---|---|---|---|---|
| | Type | Conc'n.[1] | Type | Conc'n.[1] | |
| 3-A | CaCO_3 | 50 | Antioxidant [2] | 1.0 | 52 |
| 3-B | CaCO_3 | 50 | Antioxidant [2] Thiosorbitol | 1.0 1.0 | 65 |
| 3-C | BaCO_3 | 50 | Antioxidant [2] | 1.0 | 21 |
| 3-D | BaCO_3 | 50 | Antioxidant [2] Thiosorbitol | 1.0 1.0 | 54 |
| 3-E | TiO_2 | 50 | Antioxidant [2] | 1.0 | 32 |
| 3-F | TiO_2 | 50 | Antioxidant [2] Thiosorbitol | 1.0 1.0 | 56 |

[1] Parts/100 parts rubber.
[2] 2,2'-methylenebis(6-tert-butyl-4-methyl phenol).

Any of the elastomers set forth in this specification may be substituted in any one of the preceding examples 1–3 to obtain substantially the same results as those achieved with rubber.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A cured elastomer selected from the group consisting of natural rubber and synthetic rubber made from conjugated dienes, said elastomer having incorporated therein a stabilizing amount of a phenolic antioxdant and a thio-substituted aliphatic polyol, said polyol being of the formula $$HOCH_2-(CHOH)_n-CH_2SH$$

wherein $n$ is an integer within the range of 3 to 4, said phenolic antioxidant and said polyol being present in an amount within the range of 0.1 to 5 parts by weight per 100 parts of said elastomer.

2. The elastomer of claim 1 wherein for every part by weight of phenolic antioxidant there is at least 0.25 part by weight of said polyol.

3. The elastomer of claim 1 wherein said thio-substituted aliphatic polyol is 1-thiosorbitol.

4. A cured elastomer selected from the group consisting of natural rubber and synthetic rubber made from conjugated dienes, said elastomer having incorporated therein a stabilizing amount of 2,6-di-tert-butyl-4-phenyl phenol and 1-thiosorbitol, said 2,6-di-tert-butyl-4-phenyl phenol and said 1-thiosorbitol being present in an amount within the range of 0.1 to 5 parts by weight per 100 parts of said elastomer.

5. A stabilizing composition in which the stabilizing component consists of at least one phenolic antioxidant and a thio-substituted aliphatic polyol, said polyol being of the formula $$HOCH_2-(CHOH)_n-CH_2SH$$

wherein $n$ is an integer within the range of 3 to 4, said phenolic antioxidant and said polyol being present in an amount within the range of 0.1:5.0 to 5.0:0.1 parts by weight.

6. A stabilizing composition in which the stabilizing component consists of 2,6-di-tert-butyl-4-phenyl phenol and 1-thiosorbitol, said 2,6-di-tert-butyl-4-phenyl phenol and said 1-thiosorbitol being present in an amount within the range of 0.1:5.0 to 5.0:0.1 parts by weight.

References Cited in the file of this patent

UNITED STATES PATENTS

| | | |
|---|---|---|
| 2,126,179 | Duggan | Aug. 9, 1938 |
| 2,432,296 | Dorough | Dec. 9, 1947 |